United States Patent [19]
Asai et al.

[11] Patent Number: 6,003,645
[45] Date of Patent: Dec. 21, 1999

[54] DRUM BRAKE DEVICE

[75] Inventors: Seiji Asai, Okazaki; Yasushi Kobayashi, Nagoya, both of Japan

[73] Assignee: Nisshinbo Industries Inc., Tokyo, Japan

[21] Appl. No.: 08/825,055

[22] Filed: Mar. 27, 1997

[30] Foreign Application Priority Data

Apr. 3, 1996 [JP] Japan ..................... 8-106310

[51] Int. Cl.⁶ ..................................... F16D 51/00
[52] U.S. Cl. ....................... 188/328; 188/79.54
[58] Field of Search ................ 188/78, 328, 79.56, 188/335, 341; 192/76, 75

[56] References Cited

U.S. PATENT DOCUMENTS

| 3,709,334 | 1/1973 | Kondo et al. . |
| 5,275,260 | 1/1994 | Evans et al. . |
| 5,538,112 | 7/1996 | Last ..................... 188/79.54 |

FOREIGN PATENT DOCUMENTS

| 863057 | 3/1951 | Australia ..................... 188/79.56 |
| 148589 | 10/1952 | Australia ..................... 188/328 |
| 53491 79 | 1/1981 | Australia . |
| 10833 | 2/1981 | Japan ..................... 188/328 |

*Primary Examiner*—Robert J. Oberleitner
*Assistant Examiner*—Melanie Talavera
*Attorney, Agent, or Firm*—Nikaido, Marmelstein, Murray & Oram LLP

[57] ABSTRACT

A drum brake device that functions as a leading-trailing (LT) type when the service brake is applied, and as a duo-servo (DS) type when the parking brake is applied, in which no strange noises are generated, nor is any impact load applied to any of the components, thus enabling a lighter device. The middle segment of a long link 11 is pivotable in the middle of the one brake shoe 2. A shoe clearance adjustment device 12 is provided adjacent to a service brake actuator 8 between the other brake shoe 3 and the one end of the long link 11. A parking brake actuator 16 is provided adjacent to an anchor 9 and between the other brake shoe 3 and the other end of the long link 11. The force urging the second adjacent ends of the brake shoes toward each other, is greater than the force urging the first adjacent ends of the brake shoes toward each other.

13 Claims, 11 Drawing Sheets

DRUM BRAKE DEVICE

BACKGROUND OF THE INVENTION

This invention relates to a drum brake device. More specifically, it relates to a dual mode drum brake device that functions as a leading-trailing (LT) type when the service brake is applied, and as a duo-servo (DS) type when the parking brake is applied.

Figure 12:
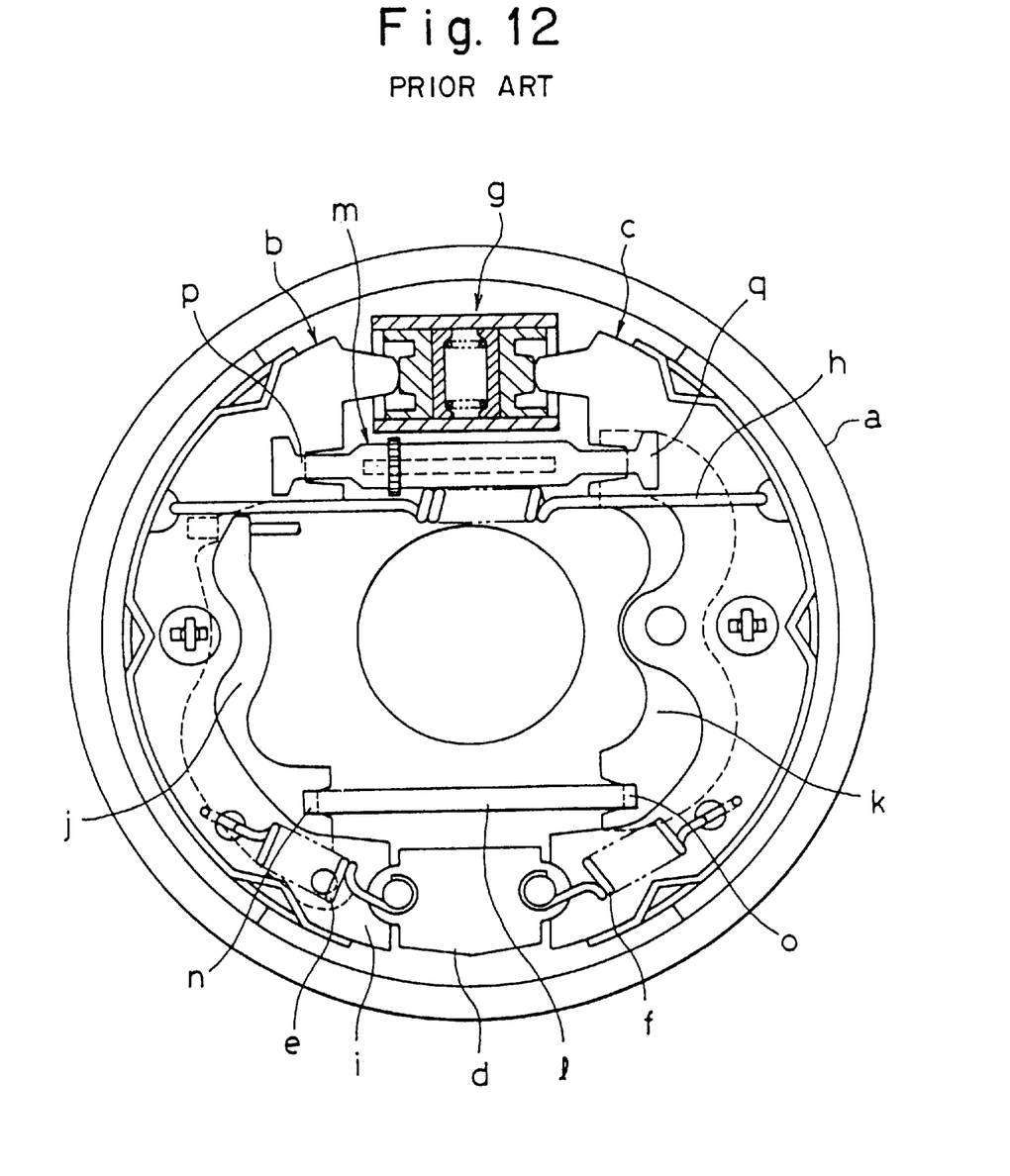
FIG. 12 is a plan view of the prior art on which this invention was based.

This type of dual mode drum brake device has been disclosed in Australian Patent Number AU-B1-53 491/79. Briefly, as shown in FIG. 12, a pair of brake shoes b, c are provided on top of a back plate a. An anchor block d is provided between the adjacent ends of each brake shoe. Two coil springs e, f bias the respective brake shoes in the direction of the anchor block. A hydraulic cylinder g is provided between the other adjacent ends of each brake shoe. A return spring h, provided adjacent to the hydraulic cylinder, biases the two brake shoes towards each other. The parking brake lever j is pivoted on one end i of one brake shoe b. An idler lever k is pivoted so as to swing on the other brake shoe c. A first and second rod I, m are provided between the two brake shoes b, c, wherein one end n of the first rod I engages the parking brake lever j, and the other end o engages the idler lever k. One end p of the second rod m engages the one brake shoe b, while the other end q engages both the other brake shoe c and the idler lever k.

The drum brake device as described above needs the following areas of improvement:

When the parking brake is applied, the adjacent ends of each side of both brake shoes move apart to spread apart the whole brake shoe assembly. In other words, the one end of both shoes also separate at once from the anchor block. When the brake drum which is interlocked with the wheels starts to rotate with the device in this state both brake shoes, the rods, and other components all turn in tandem, wherein one or the other brake shoe collides against the anchor block. The noise so generated is disconcerting to the driver. Additionally, since this impact load is applied repeatedly on the anchor block, the strength of the components becomes critical.

The cumulative effect of the tolerances of each component will be such that the idler lever could abut against the second rod or play could be generated. At the very least, play will be generated when the driver steps on the brake pedal. Accordingly, the idler lever could vibrate creating a strange noise when the vehicle is in motion or the foot brake is applied. Again, this noise can be disconcerting to the driver.

OBJECTS AND SUMMARY OF THE INVENTION

This invention was devised to make improvements on the aforementioned points, and to that end:

A first object of the invention is to provide a dual mode drum brake device which would function as a very stable leading-trailing type when the foot brake is pressed, and as a highly effective duo-servo type when the parking brake is applied.

A second object is to provide a dual mode drum brake device in which no strange noises are generated.

A third object is to provide a dual mode drum brake device in which no impact load is applied to any of the components, thus enabling a lighter device.

A fourth object is to provide a dual mode drum brake device which avoids the wheel being locked because of the brake shoe biting the brake drum or unusual dragging occuring between the brake lining and the brake drum.

In order to meet these objects and others, the present invention is a dual mode drum brake device comprised of two brake shoes provided to face each other on top of a back plate; a service brake actuator, activated by the service brake, provided between one pair of the first adjacent ends of the brake shoes; and an anchor block provided on the back plate between the other pair of the second adjacent ends of the brake shoes; wherein the middle segment of a long link is pivotable in the central region of one brake shoe, a shoe clearance adjustment device, provided adjacent to the service brake actuator and activated by the parking brake, is provided between the other brake shoe and the one end of the long link, a parking brake actuator, provided adjacent to the anchor block, is positioned between the other brake shoe and the other end of the long link, and wherein the force urging the second adjacent ends of the brake shoes toward each other is greater than the force urging the first adjacent ends of the brake shoes toward each other.

Further, the moment adjusted by arranging the force of the second shoe return spring and the distance between the pivot mount of the brake shoe with the link to the second shoe return spring, is greater than the moment adjusted by arranging the force of the first shoe return spring and the distance from the pivotal mount to the first shoe return spring.

Still further, the shoe clearance adjustment device can be adjusted manually from the exterior of the brake.

The shoe clearance adjustment device can also be equipped with an automatic adjustment mechanism which senses the amount by which the pair of brake shoes has opened and automatically adjust the clearance between the brake shoes and the brake drum.

A protuberance can be integrally formed by a press onto the middle segment of the long link. This protuberance is pivotable in a hole bored in the one brake shoe.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Example 1 is generally shown in FIGS. 1–6.

Figure 1:
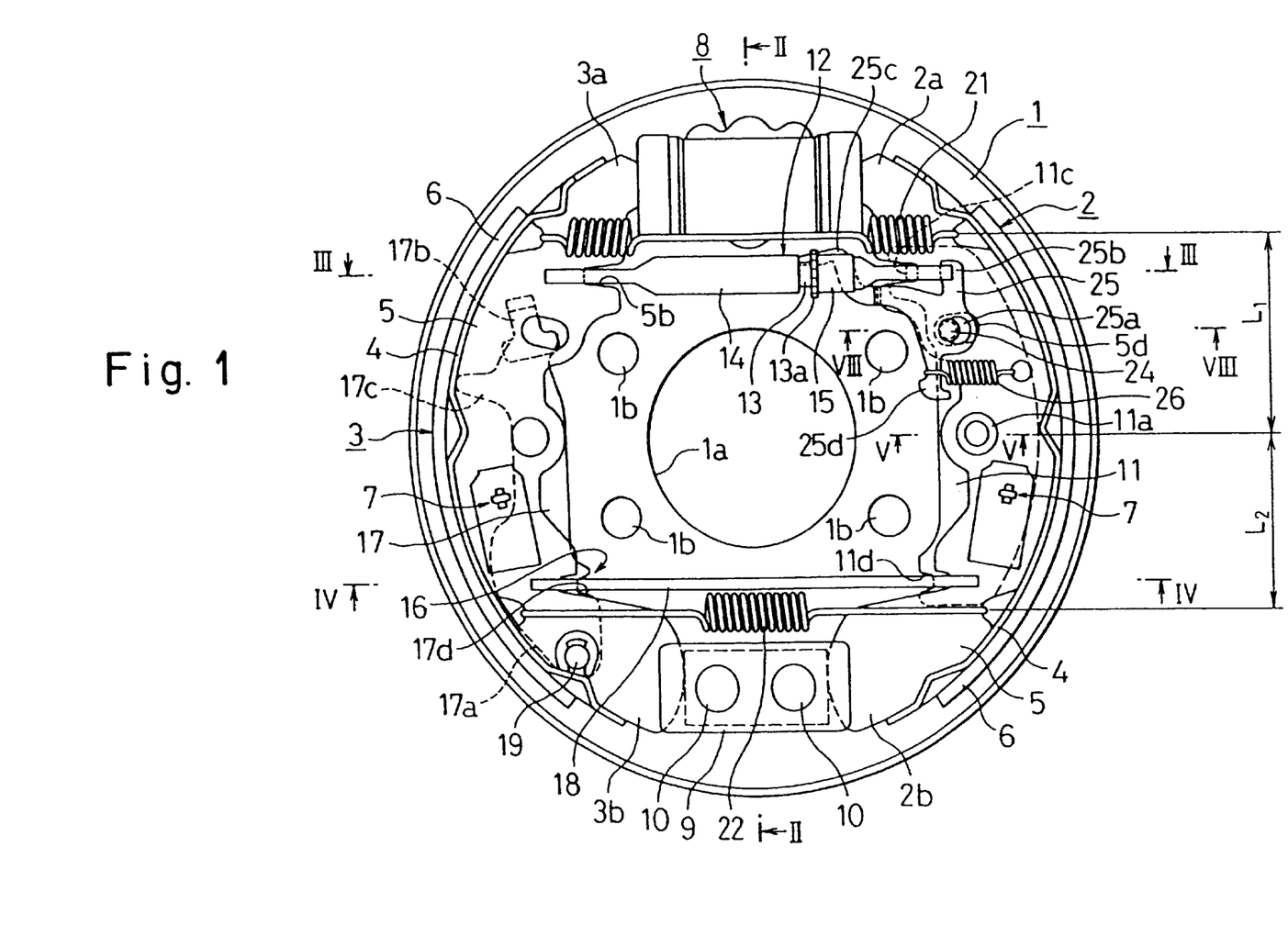
FIG. 1 is a plan view of the drum brake device of this invention as embodied in Example 1 and Example 3.
Figure 2:
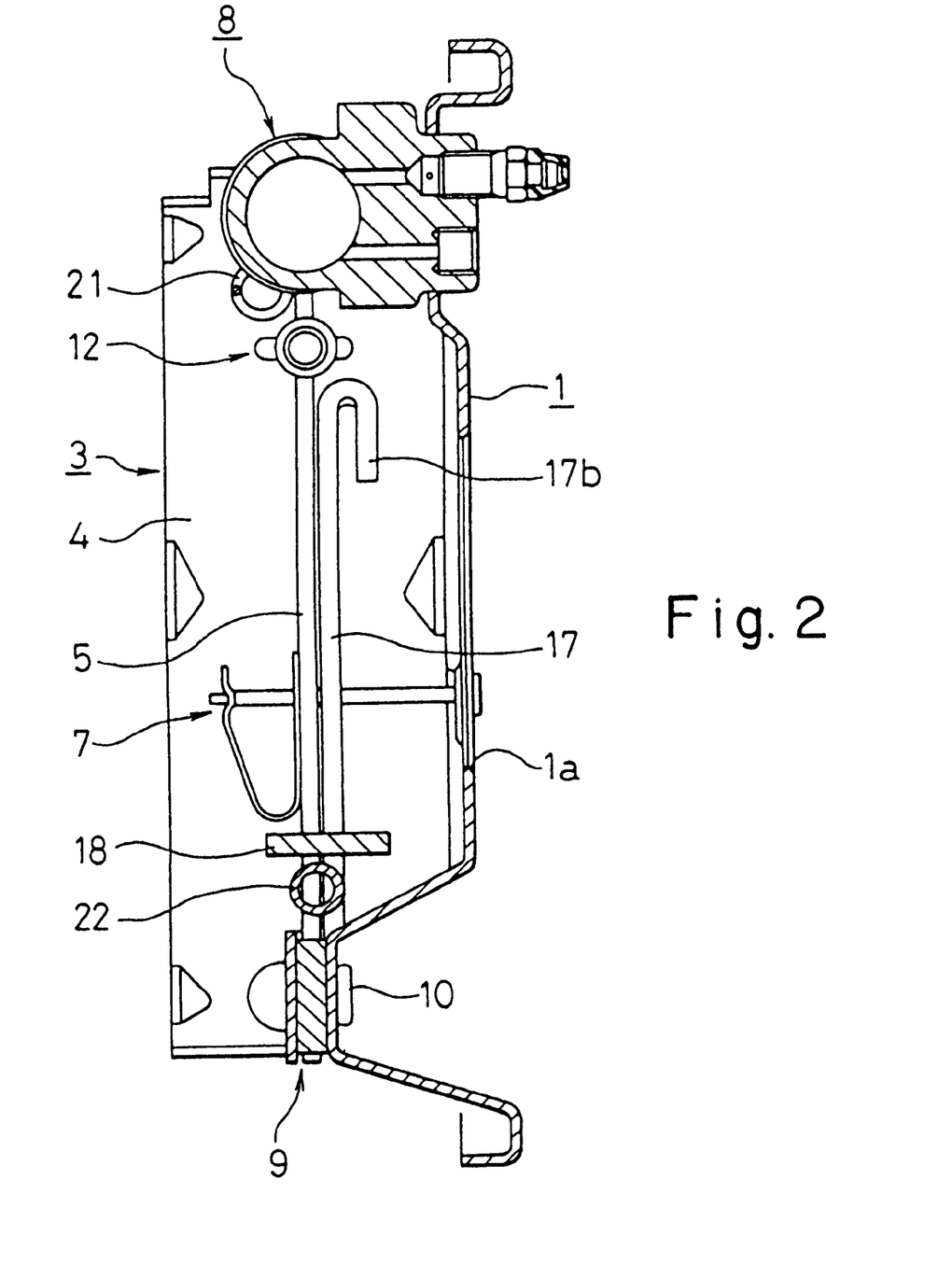
FIG. 2 is a cross section of FIG. 1 taken along line II—II.

The central hole 1a of the back plate 1 is freely inlaid in the vehicle axle, and the back plate is affixed to a stationary part of the vehicle by four bolts inserted through the bolt holes 1b. A pair of brake shoes 2, 3, are provided to face oppositely to each other. Each shoe comprises a shoe rim 4, a shoe web 5 joined to the rim 4 to form a "T" in cross section, and a lining 6 affixed around the perimeter of the shoe rim 4. Friction created as the linings are forced against a brake drum (not shown in the diagram) produces the braking action. The brake shoes 2, 3 are each mounted on top of the back plate 1 by a shoe-hold mechanism 7, 7 each comprised of a publicly disclosed plate spring and pin.

A service brake actuator 8, activated when the service brake is applied, is provided between one pair of adjacent ends 2a, 3a of the pair of oppositely-facing brake shoes 2, 3, and is affixed to the back plate 1 with bolts or other hardware. A publicly disclosed hydraulic wheel cylinder is widely used as an actuator, but an air wheel cylinder can be used.

An anchor block 9 is provided between the other pair of adjacent ends 2b, 3b of the two brake shoes 2, 3. The anchor block 9 is normally affixed on top of a raised segment of the back plate 1 by two rivets 10, 10, but it can be welded if desired. Moreover, an anchor pin can be used in place of the rectangular plate. In either case, the anchor must support each of the other adjacent ends 2b, 3b of the brake shoes 2, 3.

Figure 5:
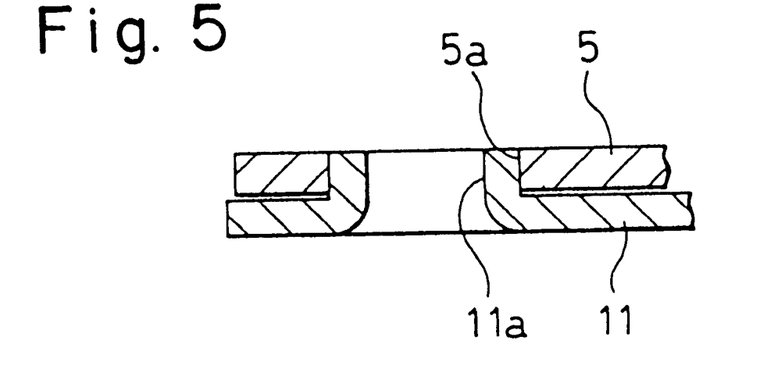
FIG. 5 is a cross section of FIG. 1 taken along line V—V.
Figure 6:
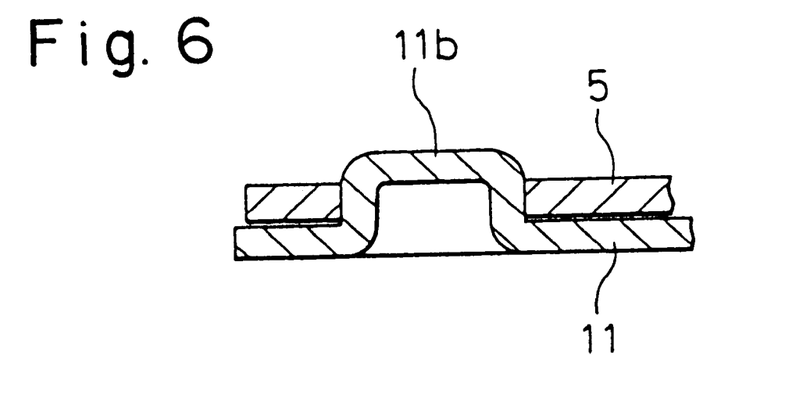
FIG. 6 illustrates a modified example of FIG. 5.

A long link 11 is set under the shoe web 5 of one brake shoe 2. A protuberance 11a, formed as burrs with a press, is formed in the central region of the link 11, and slips into the hole 5a bored in the shoe web 5. FIG. 5 illustrates the shape of the protuberance 11a; however, it can also be formed as drawing with a press to be an inverse U-shaped protuberance 11b as shown in FIG. 6. Either of the protuberances 11a or 11b is integrally formed by a press with the long link 11, but a separate pin can be easily used to support the long link 11 so as to be pivotable on the shoe web.

Figure 3:
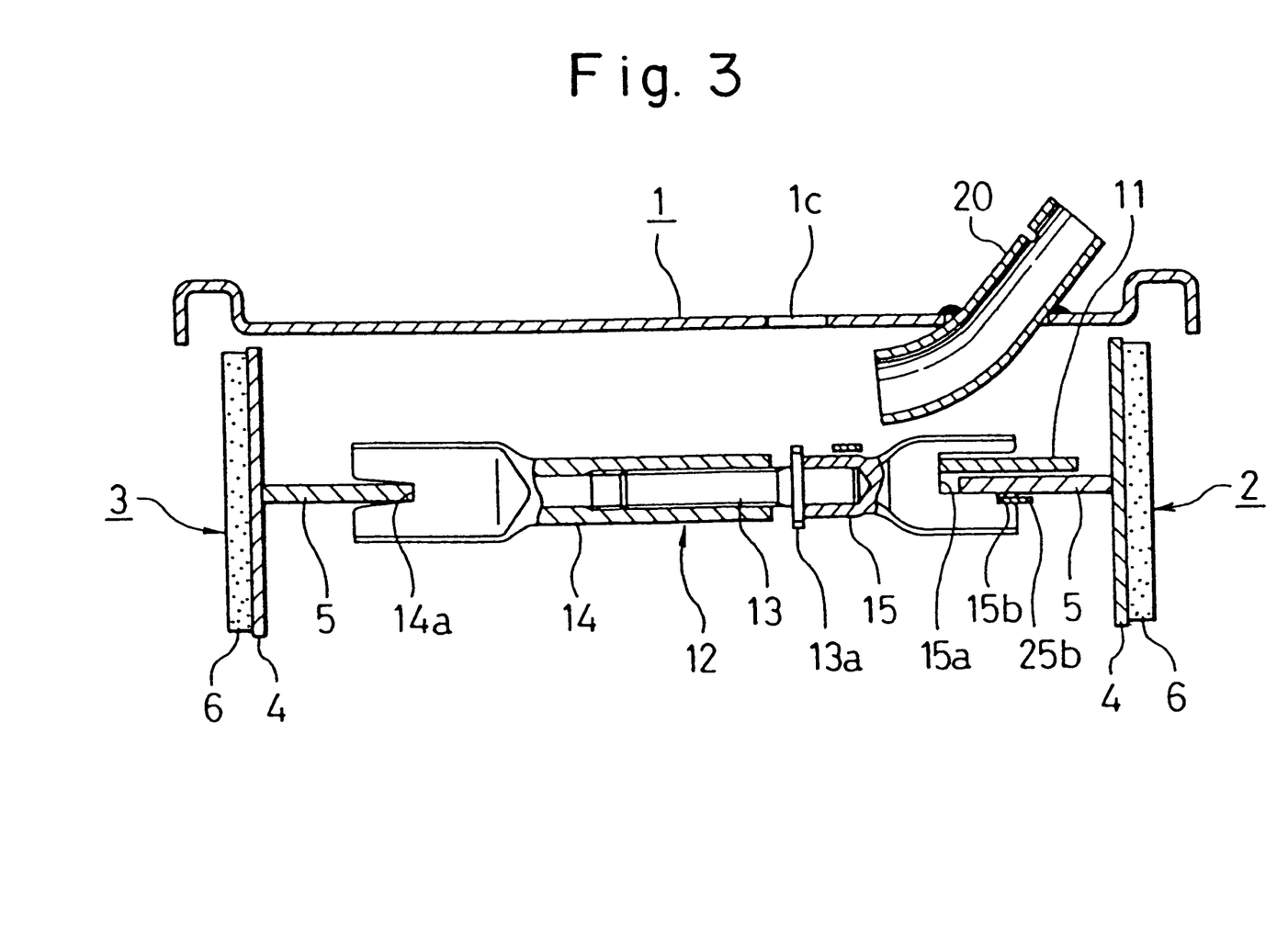
FIG. 3 is a cross section of FIG. 1 taken along line III—III.

A shoe clearance adjustment device 12, of a known screw type shown in FIG. 3, adjusts the clearance between the brake drum and the brake shoes 2, 3. These diagrams illustrate an automatic shoe clearance adjustment device, to be described later. However, a screw driver can be inserted into the hole 1c bored in the back plate 1 or the hole bored in the brake drum (not shown in the diagram), to turn the toothed adjustment wheel 13a which is integrally formed onto the bolt 13. Screwing the toothed adjustment wheel 13a in or out of the threaded tube segment 14 will manually adjust the entire length of the shoe clearance adjustment device 12. A socket 15 supports one end of the bolt 13. A thin plate tip is formed on the end of the tube segment 14 and the end of the socket 15. The socket 15 and the tube segment 14 engage the brake shoes 2, 3 respectively, with a notched groove 14a, 15a formed in each plate tip respectively. The bottom of the notched groove 14a abuts against the bottom of the notched groove 5b formed on the shoe web 5 of the other brake shoe 3, while the bottom of the notched groove 15a abuts against the bottom of the notched groove 11c on the one end of the long link 11 as shown in FIG. 1.

Figure 4:
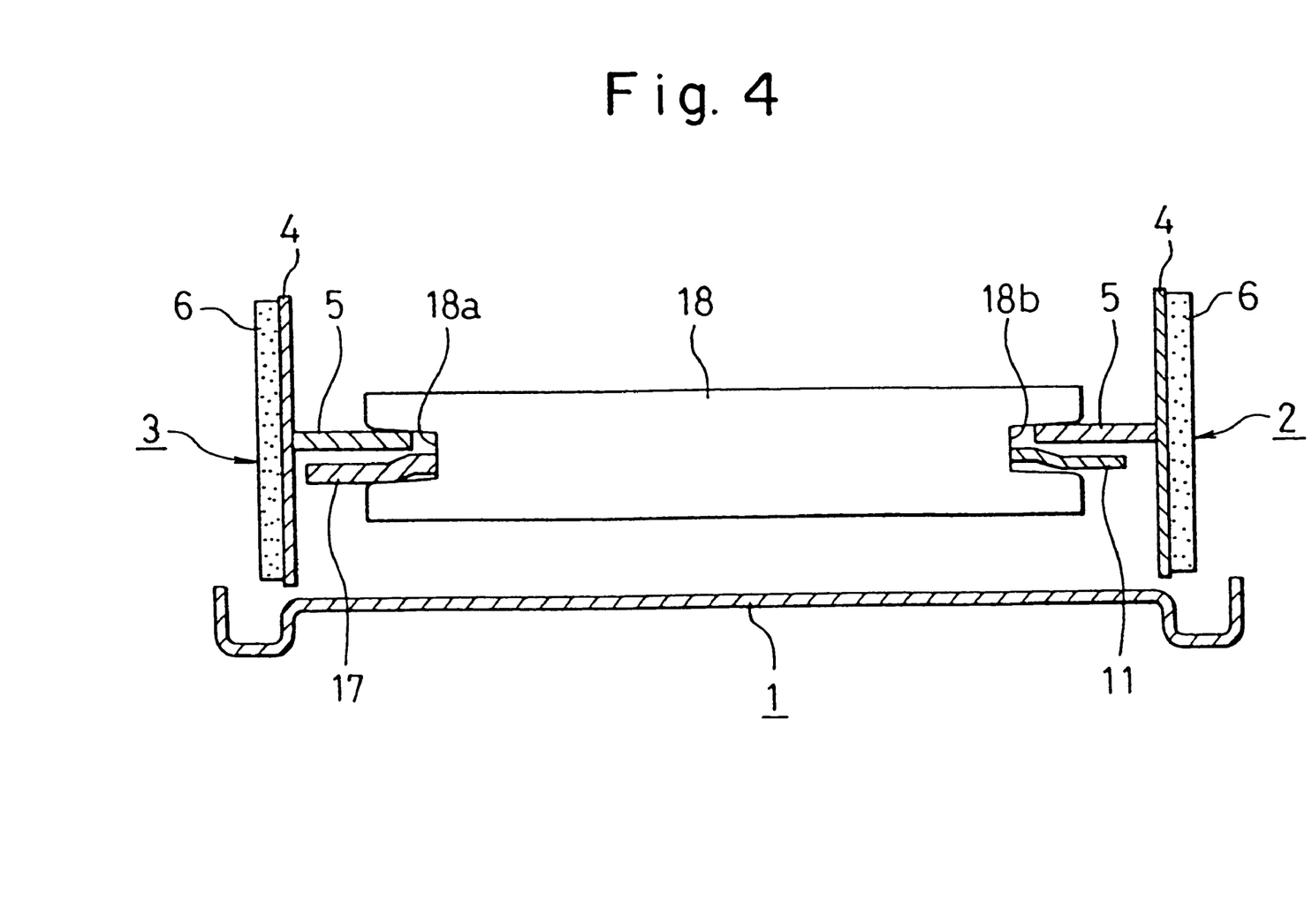
FIG. 4 is a cross section FIG. 1 taken along line IV—IV.

The parking brake actuator 16 is activated when the parking brake is applied, and comprises a forward-pull brake lever 17, a strut 18, and other components. The brake lever 17 is superimposed on the shoe web 5 of the other brake shoe 3. Its base end 17a is pivotable on a pin 19 on the other end 3b of brake shoe 3. A U-shaped groove, onto which is latched the remote control cable, (not shown in the diagram) is formed on the free end 17b. A stopper 17c abutting against the inner face of the shoe rim 4 regulates the return position of the brake lever 17 when the parking brake is not activated. Notched grooves 18a, 18b are formed on either end of the plate strut 18 as seen in FIG. 4. The bottom of the notched groove 18a abuts against the bottom of a notched groove 17d in the brake lever 17. The bottom of notched groove 18b abuts against the bottom of a notched groove 11d formed in the other end of the long link 11.

As shown in FIG. 3, a pipe 20 can serve as the outer casing of the remote control cable (not shown in the diagram). The outer casing of the cable is affixed to the back plate 1.

As shown in FIG. 1, an upper or first brake shoe return spring 21, positioned adjacent to the service brake actuator 8 activated when the service brake is applied, is stretched between the one pair of adjacent ends 2a, 3a of the two brake shoes 2, 3. A lower or second brake shoe return spring 22, positioned adjacent to the anchor block 9, is stretched between the other pair of adjacent ends 2b, 3b of the two brake shoes 2, 3. The mounted loads of the return springs are determined such that the ends of the brake shoes 2, 3 on the anchor block 9 side do not spread apart. That is, the first and second shoe return springs 21, 22 are selected so as to satisfy the following relational formula for the respective moment acting on the brake shoes 2, 3:

F1×L1<F2×L2, where

F1 Mounted load of first return spring 21

F2 Mounted load of second return spring 22

L1 Distance from the pivot point of brake shoe 2 with link 11 to the first return spring 21

L2 Distance from the pivot point of brake shoe 2 with link 11 to the second return spring 22

When the driver steps on the brake pedal, the service brake actuator 8 is pressurized and extends. The one ends 2a, 3a of both brake shoes 2, 3 spread open, with the point of abutment of the other ends 2b, 3b with the anchor block 9 as the fulcrum. This forces the linings 6, 6 against the rotating brake drum, and the friction so created will brake the vehicle.

The operation of the parking brake is explained next, with each component turning in the direction as shown in FIG. 1.

For example, when the hand brake lever, is pulled, the free end 17b of the brake lever 17 is pulled to the right by the remote control cable, (not shown in diagram). At this point, the brake lever 17 turns clockwise with the pin 19 which the free end 17a pivots as the fulcrum and presses against the strut 18 with the lever-ratio. As the strut 18 presses against the notched groove 11d of the other end of the long link 11, the link 11 turns counterclockwise, with its protuberance 11a as the fulcrum. The force is transferred to the notched groove 5b of the other brake shoe 3 via the shoe clearance adjustment device 12, wherein the one end 3a of the brake shoe 3 spreads open, with the other end 3b as the fulcrum, and is pressed against the brake drum.

Moreover, as the brake lever 17 is pulled, a force is generated to turn the long link 11c ounterclockwise, with the one notched groove 11c abutting the shoe clearance adjustment device 12 as the fulcrum, and the action force is transferred to the hole 5a of the one brake shoe 2 by the protuberance 11a. At this time, the torque from the mounted load of the second return spring 22 is large, whereby the brake shoe 2 also opens with its other end 2b as the fulcrum, and is pressed against the brake drum.

As is evident from this explanation, the brake shoes 2, 3 do not separate from the anchor block 9 until the brake drum rotates when the parking brake is applied. The brake shoes 2, 3 do not separate from the anchor block 9 when the service brake is applied. The effect is obviously the same when both brakes are applied together. Accordingly, the other adjacent end 2b or 3b of the brake shoe 2 or 3 respectively does not collide with the anchor block 9 to generate any noise, nor is an impact load applied to the anchor block. That is, the effect differs from the prior art, in which when the parking brake is applied, the brake shoes 2, 3 will open completely wherein the other adjacent ends 2b, 3b will separate from the anchor block 9, thus generating a noise when the brake drum starts to rotate, and applying an impact load to the anchor block. In addition, the adjacent ends 2b, 3b will not be separated from the anchor block 9 even in the situation that the brake lever 17 is not set its return position precisely, thereby maintaining the stability of the brake shoes 2, 3 while driving.

Figure 7:
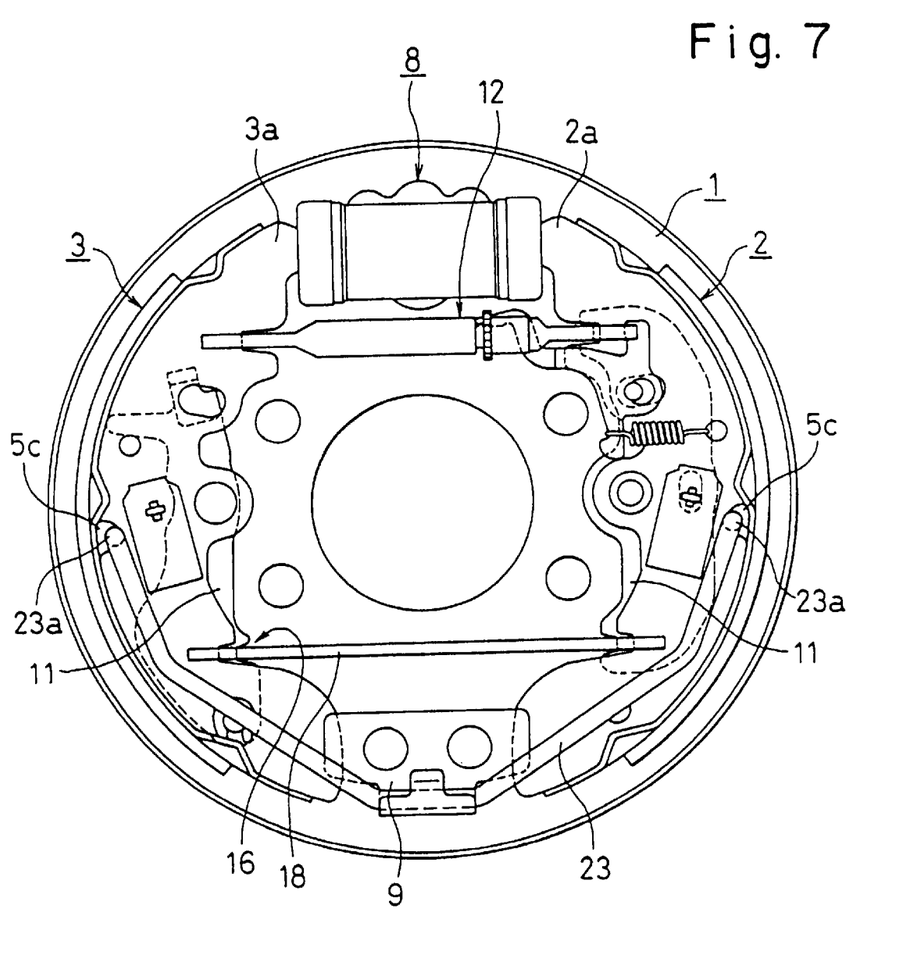
FIG. 7 is a plan view of the drum brake device of this invention as embodied in Example 2.

FIG. 7 illustrates Example 2, another embodiment of this invention, in which the shoe return springs have been modified. Otherwise, all other components are virtually the same as in Example 1, and are identified with the same symbol wherein an explanation is omitted here.

That is, the two return springs 21, 22 as shown in FIG. 1 are replaced with one shoe return spring 23, a fairly thick wire spring configured in the shape of a slightly obtuse U. The middle segment of the wire spring 23 is mounted on top of the anchor block 9, and the two free ends 23a, 23a are bent so as to latch in holes 5c, 5c bored on the anchor block side in the two brake shoes 2, 3. The wire spring 23 should be stretched in a location such that when the parking brake is applied, the one ends 2a, 3a. of the brake shoes 2, 3 will open.

The configuration of the shoe return spring is not limited to that shown in Example 1 or Example 2. A variety of shapes and configurations can be used, such as splitting the lower return spring into two segments as configured in some prior art devices.

Figure 8:
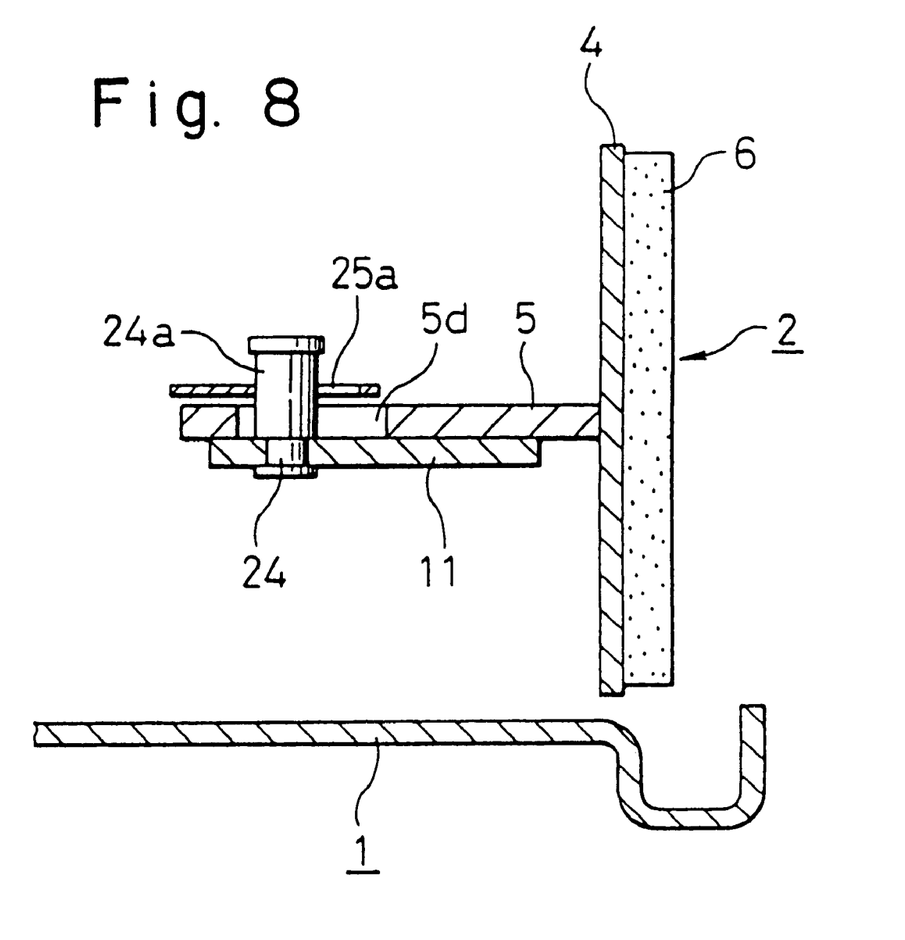
FIG. 8 is a cross section of FIG. 1 taken along line VIII—VIII for the drum brake device of this invention as embodied in Example 3.

Example 3 is another embodiment of this invention shown in FIGS. 1, 3 and 8 which is equipped with an incremental type of automatic shoe clearance adjustment device which is activated when the service brakes are applied.

A pin 24 affixed on the one end side of the long link 11 freely penetrates through a slot 5d bored in the shoe web 5 of one brake shoe 2, and a hole 25a, provided in the middle of the adjustment lever 25. The adjustment lever 25 is pivotable around the stem component 24a of the pin 24 which protrudes above the slot 5d. One arm 25b of the adjustment lever 25 abuts against the stepped face 15b of the notched groove 15a of the socket 15, while the other arm 25c engages the toothed adjustment wheel 13a of the adjustment bolt 13.

Alternatively, the pin 24 can be affixed to the shoe web 5, and the adjustment lever 25 can pivot on the stem component 24a of the pin 24.

An adjustment spring 26 is stretched between another arm 25d of the adjustment lever 25 and the shoe web 5. As shown in FIG. 1, the adjustment spring 26 is biased so as to turn the adjustment lever 25 counterclockwise with the pin 24 as the fulcrum.

When the service brake is applied and the two brake shoes 2, 3 spread open, the automatic shoe clearance adjustment device 12 trails the other brake shoe 3. On the other hand, the long link 11 trails the one brake shoe 2, but at this time, the link 11 receives the biasing of the adjustment spring 26 and is therefore turned clockwise as shown in FIG. 1, with its protuberance 11a as the fulcrum. As a result, the adjustment lever 25 is turned counterclockwise as shown in FIG. 1 in an amount equivalent to the sum of the degree of rotation of the pin 24 and the amount of movement of the automatic shoe clearance adjustment device.

At this point, if the linings 6, 6 are eroded, and the degree of rotation of the other arm 25c of the adjustment lever 25 exceeds the intertooth pitch of the toothed adjustment wheel 13a, the bolt 13 is rotated to be screwed out of the tube 14. This automatically adjusts the gap between the brake drum and the linings 6, 6 to maintain a constant clearance.

When the parking brake is applied, the automatic shoe clearance adjustment device 12, long link 11, the adjustment lever 25, and other components all trail in tandem the other brake shoe 3 just by the amount it opens. However, with the one brake shoe 2, the pin 24 is freely inlaid to move within its slot 5d, hence it has no effect on the adjustment lever 25. As a result, any automatic adjustment action will not be less than the movement of the adjustment lever 25 when the service brake is applied.

As is evident from this configuration, the biasing force of the adjustment spring 26 constantly acts on the long link 11, even when the service brake is applied, hence the link 11 will not vibrate.

Figure 9:
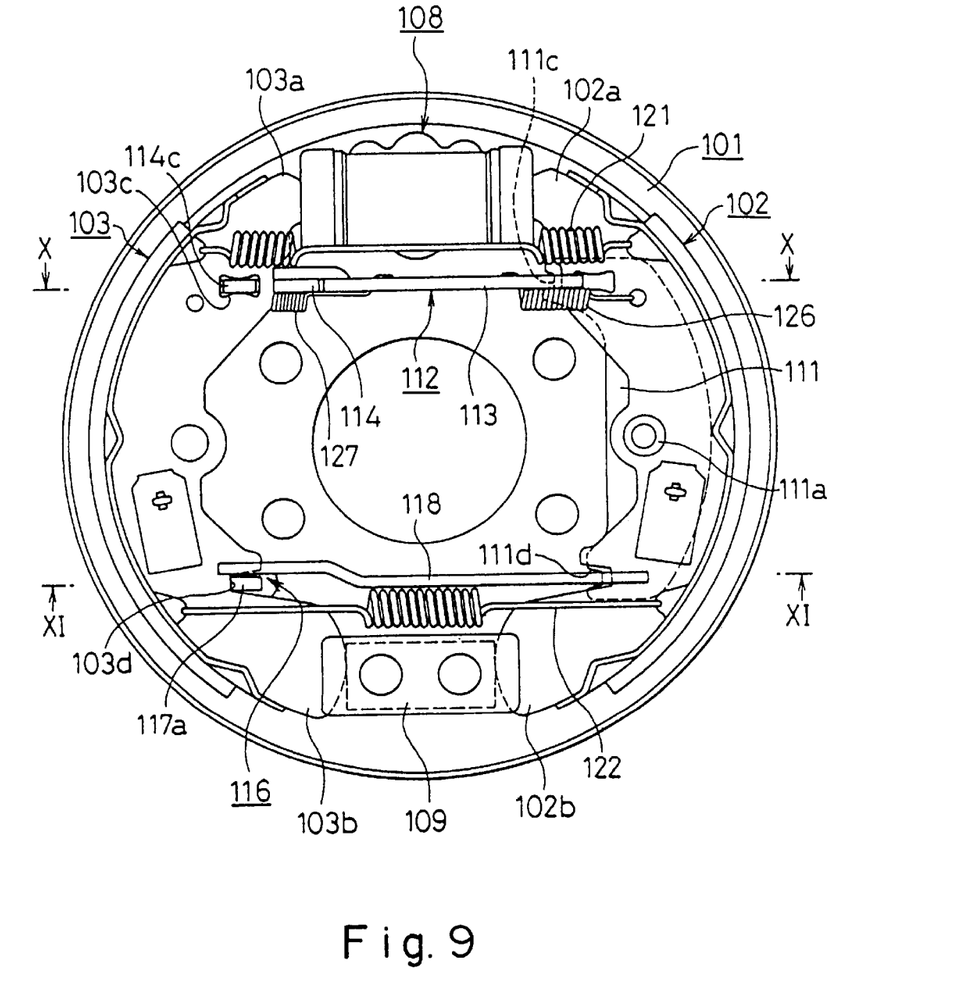
FIG. 9 is a plan view of the drum brake device of this invention as embodied in Example 4.
Figure 10:
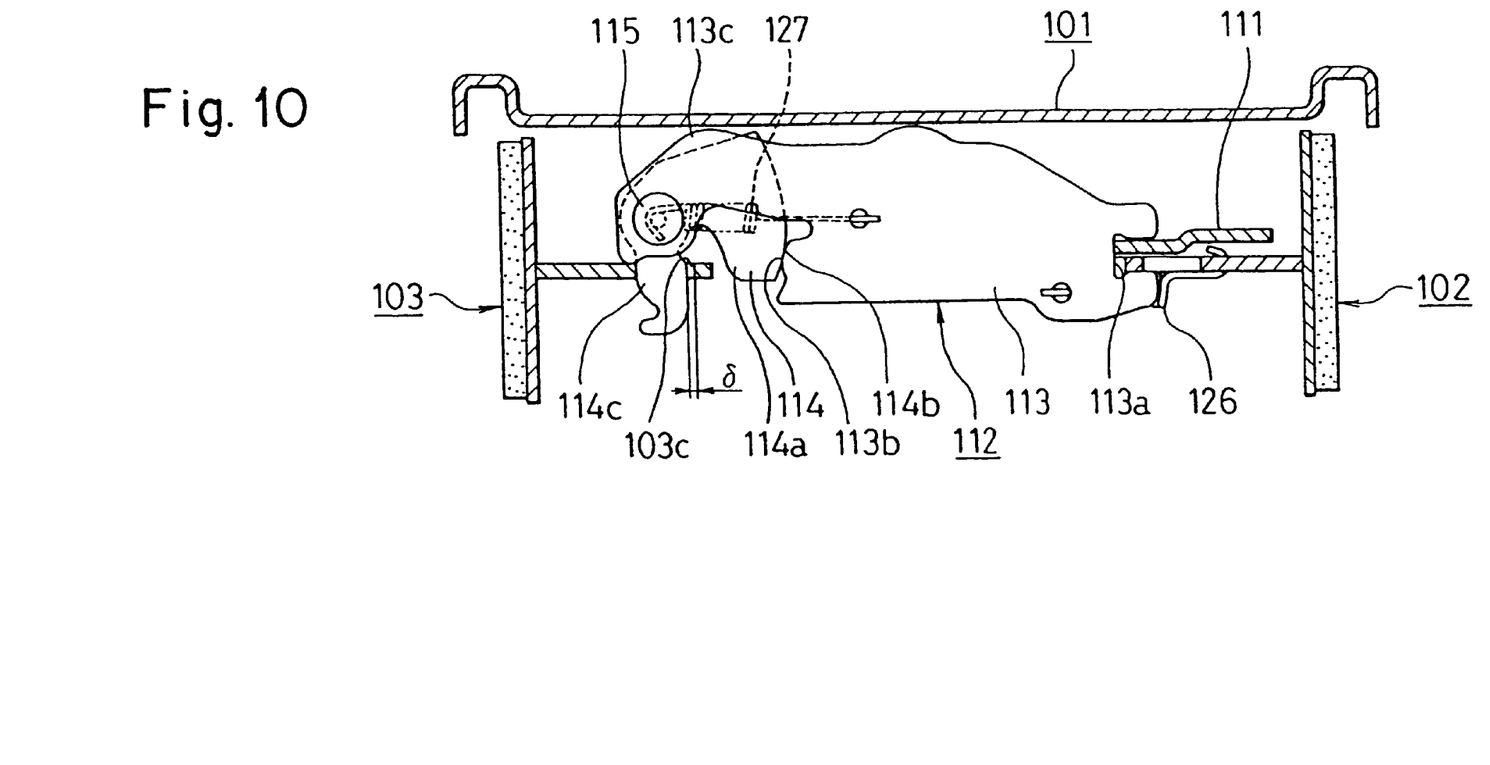
FIG. 10 is a cross section of FIG. 9 taken along line X—X.
Figure 11:
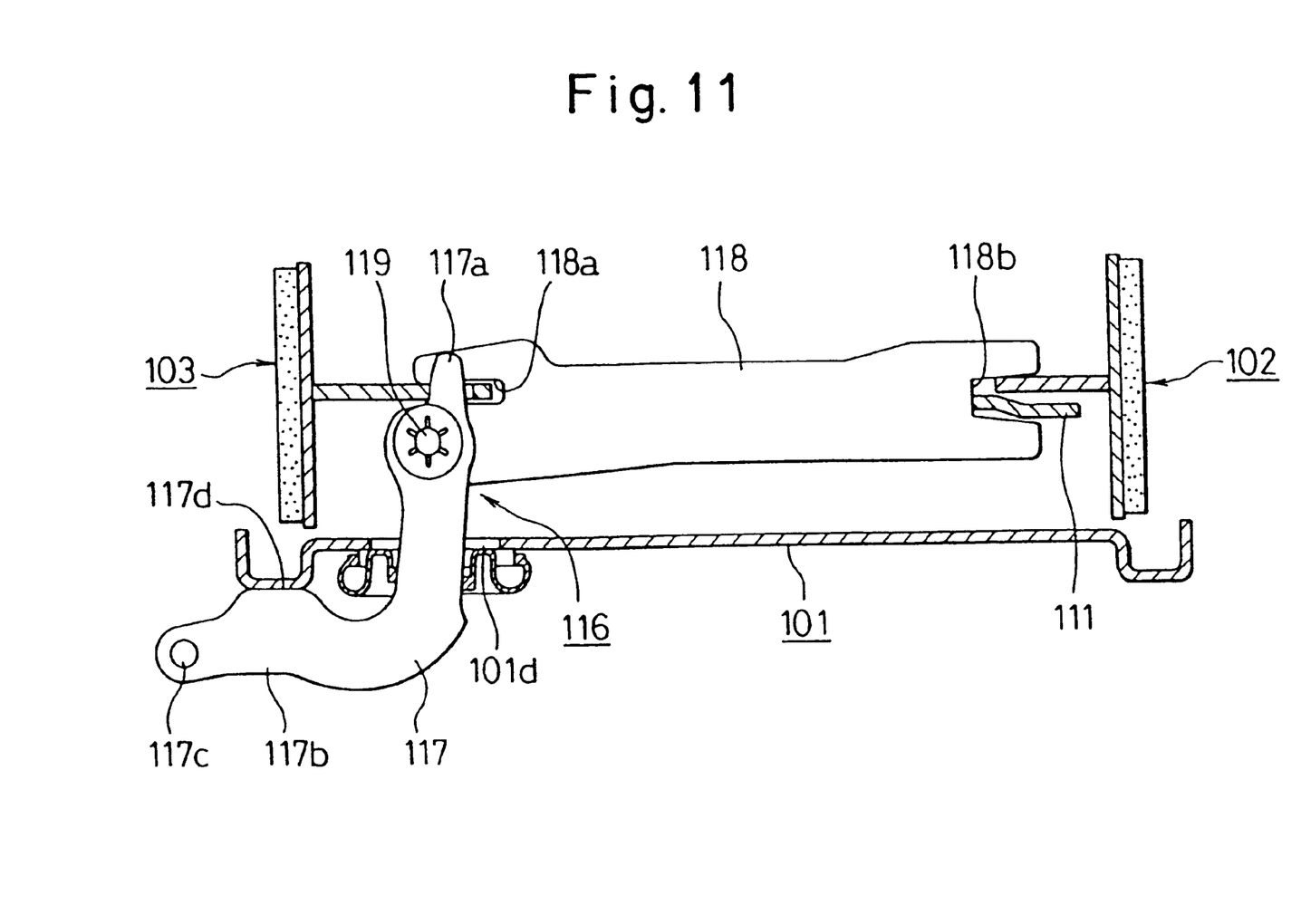
FIG. 11 is a cross section of FIG. 9 taken along line XI—XI.

Example 4 is another embodiment of this invention shown in FIGS. 9–11 which is equipped with a one-shot type of automatic shoe clearance adjustment device for use when the service brake is applied, and a cross-pull type of parking brake. Those components which are the same as in Example 1 and Example 2 are identified with a 100-series of numbers, for which a detailed explanation is omitted here.

As shown in FIG. 9, these components include a back plate 101, a pair of brake shoes 102, 103 with one pair of adjacent ends 102a, 103a and the other pair of adjacent ends 102b, 103b, an actuator 108 activated when the service brake is applied, an anchor block 109, a long link 111 with a protuberance 111a, a notched groove 111c on one end, and a notched groove 111d on the other end, an upper return spring 121, and a lower return spring 122. The mounted load of the lower return spring 122 is selected such that when the parking brake is applied, the other ends 102b, 103b of the brake shoes 102, 103 do not spread open.

The automatic shoe clearance adjustment device 112 is configured from a plate adjustment strut 113, a bell crank lever 114, and springs 126, 127. The bottom of the notched groove 113a formed on one end of the adjustment strut 113 abuts against the bottom of the notched groove 111c on one end of the long link 111. Small, short teeth 113b are carved in the middle of the strut 113.

The middle segment of the bell crank lever 114 is supported by the stem of a pin 115 so as to pivot on the other end 113c of the strut 113 and to move lengthwise along the plate face of the strut 113. A fan-shaped arm 114a on one end of the bell crank lever has small, short teeth 114b carved around its perimeter which mesh with the small short teeth 113b of the strut 113. The other arm 114c with a cam face is positioned with a clearance of δ in the rectangular hole 103c formed in brake shoe 103.

An adjustment spring 126 is stretched between the brake shoe 102 and the adjustment strut 113. Another spring 127 is stretched between the adjustment strut 113 and the pin 115. The mounted load of the adjustment spring 126 is set to be greater than that of spring 127.

A cross-pull type of actuator 116, activated when the parking brake is applied, is configured from the brake lever 117, strut 118, and other components. The finger-shaped segment 117a on one end of the brake lever 117 abuts against the bottom of the notched groove 103d formed on the other end of brake shoe 103. The arm 117b on the other end of the brake lever 117 penetrates freely through the hole 101d in the back plate 101. A mounting hole 117c for connecting the remote control cable (not shown in the diagram), is bored on the reverse L-shaped end of the arm 117b. A protuberance 117d is also formed on the brake lever 117, and abuts against the reverse side of the back plate 101 to regulate the return position of the lever, but is not restricted to this configuration.

The strut 118 has a notched groove 118a formed on one end which holds the other end of brake shoe 103. The middle segment of the brake lever 117 is also pivotable by the pin 119 at this end. Another notched groove 118b is also formed on the other end of the strut 118, the bottom of which abuts the bottom of the notched groove 111d on the other end of the long link 111.

The action of this embodiment when the service brake is applied is the same as that of the embodiment of Example 1, and when the parking brake is applied, the only difference is that the brake lever 117 has been changed to a cross-pull type. That is, when the mounting hole 117c of the brake lever 117 is pulled by the remote control cable, (not shown in the diagram), the brake lever 117 presses against the strut 118 by the pin 119 with the point of abutment with the brake shoe 103 as the fulcrum. The force of this action is transferred in sequence to the long link 111, automatic shoe clearance adjustment device 112, and finally the rectangular hole 103c of the other brake shoe 103, wherein the one end 103a of brake shoe 103 opens, with the other end 103b as the fulcrum, and engages the brake drum.

Next, the action force is imparted towards the other side of the brake onto the protuberance 111a of the long link 111 with the point of abutment with the adjustment strut 113 as the fulcrum, wherein the one end 102a of brake shoe 102, with the other end 102b as the fulcrum, also opens and engages with the brake drum.

As is clearly evident, the movements of both brake shoes 102, 103, when either the service brake or parking brake is applied, is the same as for the previous embodiments, and the same effectiveness in operation can be obtained.

When the service brake is applied and the two brake shoes 102,103 spread open, the automatic shoe clearance adjustment device 112 receives the action force of the adjustment spring 126 and trails the one brake shoe 102. At this point, if the linings 6, 6 are eroded and the amount by which the shoes have opened exceeds the total of the clearance δ of the bell crank lever 114 plus the height of the small short teeth 114b, then the bell crank lever 114 turns such that the automatic shoe clearance adjustment device 112 is extended by an amount equivalent to one tooth only to close the gap with the brake drum.

When the parking brake is applied, the only action is that the adjustment strut 113 and the bell crank lever 114 move in tandem with the other brake shoe 103 to the left, and the adjustment spring 126 extends to move the one brake shoe 102 to the right as shown in FIG. 9. Thus, there is no effect on the automatic adjustment action.

The action force of the adjustment spring 126 constantly acts on the long link 111, hence the link 111 will not vibrate. That is, when the service brake is applied, the mounting force of the adjustment spring 126 is applied, but when the parking brake is applied, the action force of the adjustment spring 126 is still applied.

This invention is not, by any means, limited to the aforementioned embodiments. For example, an incremental type of automatic shoe clearance adjustment device can be combined with a cross-pull type of parking brake; or a one-shot type automatic shoe clearance adjustment device can be combined with a forward-pull type of parking brake. Other examples include superimposing the long link 11, 111 on that face of the shoe web 5 on which the brake drum is mounted. The possibility of many other variations should be evident to those people technically skilled in this industry.

As is evident from the aforementioned configurations, this invention provides the following advantages:

The brake shoes do not separate from the anchor block, even when the parking brake is applied, in which case no noise is generated even when a torque is generated on the brake drum, thus eliminating any discomfort or anxiety for the driver.

No impact load is applied to the anchor block, hence the strength of its periphery can be reduced to make the device lighter.

The adjacent ends 2b, 3b will not be separated from the anchor block 9 even in the situation that the brake lever 17 is not set in its return position precisely, thereby avoiding the unusual dragging between the lining and the drum brake or the wheel being locked when the brake shoe bites the brake drum.

The ends of the brake shoes on the anchor block side can be prevented from opening solely and easily by a proper setting of the mounting loads of the shoe return springs and their positions.

No impact load is applied to any component, which assures long-term reliability in terms of strength, durability, and other properties.

The biasing force of the adjustment spring is applied on the long link, regardless of whether there is no braking action or when the service brake is applied, thus eliminating any vibration and noise, again eliminating any discomfort or anxiety for the driver.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

We claim:

1. A dual mode drum brake device comprising:

a back plate, two brake shoes provided to face each other on top of said back plate, a service brake actuator on said back plate between one pair of the first adjacent ends of said brake shoes, an anchor block on said back plate between the other pair of the second adjacent ends of said brake shoes, a long link pivotably mounted at a pivot point on one brake shoe, a shoe clearance adjustment device adjacent to said service brake actuator provided between the other brake shoe and one end of said long link, said one end of said long link being functionally engaged with said shoe clearance adjustment device, a parking brake actuator adjacent to said anchor block provided between the other brake shoe and the other end of said long link, said other end of said long link being functionally engaged with said parking brake actuator, said pivot point being between a first engaging portion of said brake shoe and said shoe clearance adjustment device and a second engaging portion of said long link and said parking brake actuator, and shoe return spring means for returning said brake shoes to an original position following activation by one of said service brake actuator and said parking brake actuator, wherein the force urging the second adjacent ends of the brake shoes toward each other, is greater than the force urging the first adjacent ends of the brake shoes toward each other, whereby the second adjacent ends of the brake shoes do not separate from the anchor block upon activation of said service brake actuator and do not separate from the anchor block upon activation of said parking brake actuator until an associated brake drum rotates.

2. A dual mode drum brake device as claimed in claim 1, wherein said shoe return spring means includes a first shoe return spring and a second shoe return spring, and wherein the moment applied to the second adjacent ends of the brake shoes, which is a combination of the force of the second shoe return spring and a distance from said pivot point of said brake shoe with said link to said second shoe return spring, is greater than the moment applied to the first adjacent ends of the brake shoes, which is a combination of the force of the first shoe return spring and a distance from said pivot point to said first shoe return spring.

3. A dual mode drum brake device as claimed in claim 1, wherein said shoe return spring means comprises a single shoe return spring which engages and urges both brake shoes together at a position between the central region of the brake shoes and the second adjacent ends.

4. A dual mode drum brake device as claimed in claim 2, in which said shoe clearance adjustment device can be adjusted manually from an exterior of the drum brake device.

5. A dual mode drum brake device as claimed in claim 3, in which said shoe clearance adjustment device can be adjusted manually from an exterior of the drum brake device.

6. A dual mode drum brake device as claimed in claim 2, in which said shoe clearance adjustment device senses an amount by which said pair of brake shoes has opened and automatically adjusts the clearance between the brake shoes and a brake drum.

7. A dual mode drum brake device as claimed in claim 3, in which said shoe clearance adjustment device senses an amount by which said pair of brake shoes has opened and automatically adjusts the clearance between the brake shoes and a brake drum.

8. A dual mode drum brake device as claimed in claim 2, wherein a protuberance is integrally press-formed at said pivot point and is pivotally engaged in a hole bored at said pivot point in said one brake shoe.

9. A dual mode drum brake device as claimed in claim 3, wherein a protuberance is integrally press-formed at said pivot point and is pivotally engaged in a hole bored at said pivot point in said one brake shoe.

10. A dual mode drum brake device as claimed in claim 4, wherein a protuberance is integrally press-formed at said pivot point and is pivotally engaged in a hole bored at said pivot point in said one brake shoe.

11. A dual mode drum brake device as claimed in claim 5, wherein a protuberance is integrally press-formed at said pivot point and is pivotally engaged in a hole bored at said pivot point in said one brake shoe.

12. A dual mode drum brake device as claimed in claim 6, wherein a protuberance is integrally press-formed at said pivot point and is pivotally engaged in a hole bored at said pivot point in said one brake shoe.

13. A dual mode drum brake device as claimed in claim 7, wherein a protuberance is integrally press-formed at said pivot point and is pivotally engaged in a hole bored at said pivot point in said one brake shoe.

* * * * *